A. W. LISSAUER.
DRIER.
APPLICATION FILED DEC. 24, 1917.

1,277,961.

Patented Sept. 3, 1918.
2 SHEETS—SHEET 1.

WITNESSES
Oliver H. Holmes
B. Joffe

INVENTOR
A. W. Lissauer
BY Munn & Co.
ATTORNEYS

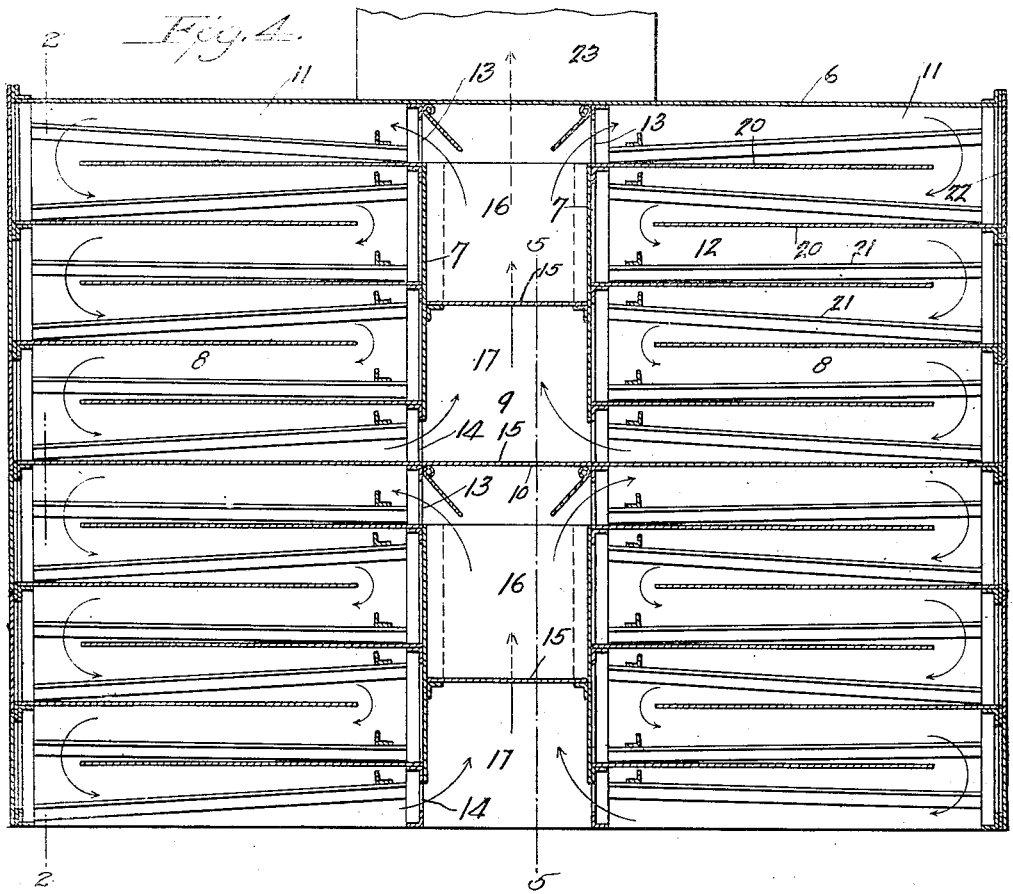
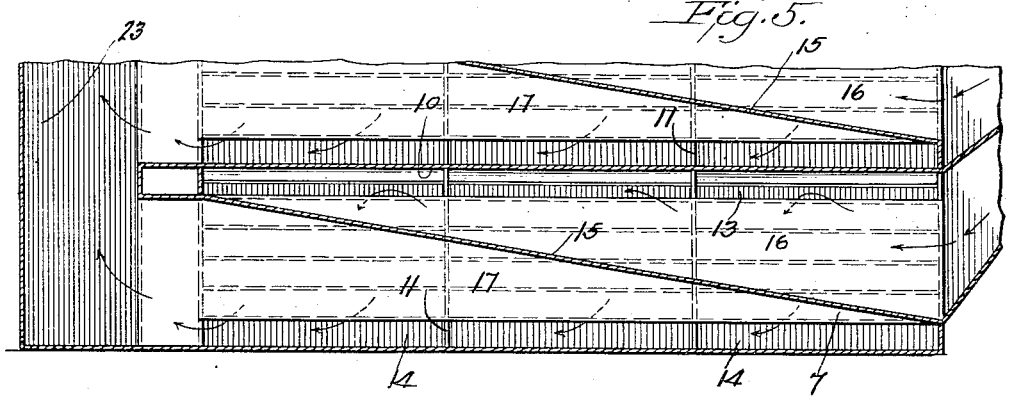

UNITED STATES PATENT OFFICE.

ADOLPH W. LISSAUER, OF NEW YORK, N. Y.

DRIER.

1,277,961.  Specification of Letters Patent.  Patented Sept. 3, 1918.

Application filed December 24, 1917. Serial No. 208,648.

*To all whom it may concern:*

Be it known that I, ADOLPH W. LISSAUER, a citizen of the United States, and a resident of the city of New York, borough of Manhattan, in the county and State of New York, have invented a new and Improved Drier, of which the following is a full, clear, and exact description.

My invention relates to driers and an object thereof is to provide a simple and efficient drier whereby the material placed therein can be dried thoroughly and expeditiously without supplying heat directly to the drier.

Another object of the invention is to provide a drier in which the air coming from the drier can be mixed with the atmospheric air and sent again through the drier, thereby obtaining a better efficiency in the drying in utilizing the moisture present in the air which came from the drier.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views:

Fig. 4 is a cross section through the drier; and

Fig. 5 is a section on line 5—5, Fig. 4.

Figure 1:
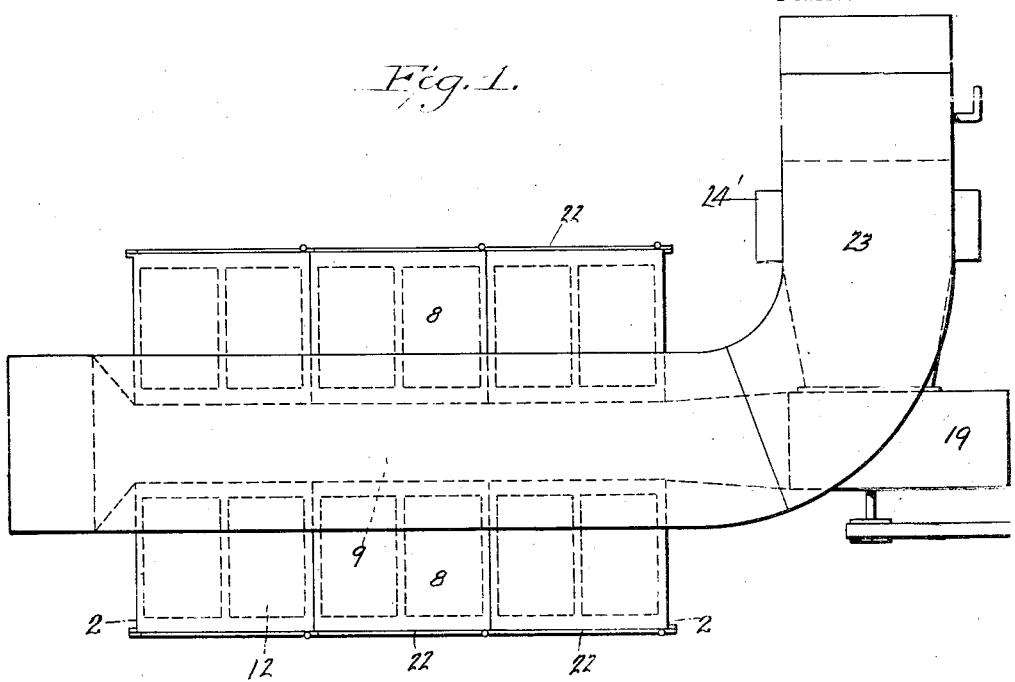
Figure 1 is a plan view of a drier embodying my invention.
Figure 2:
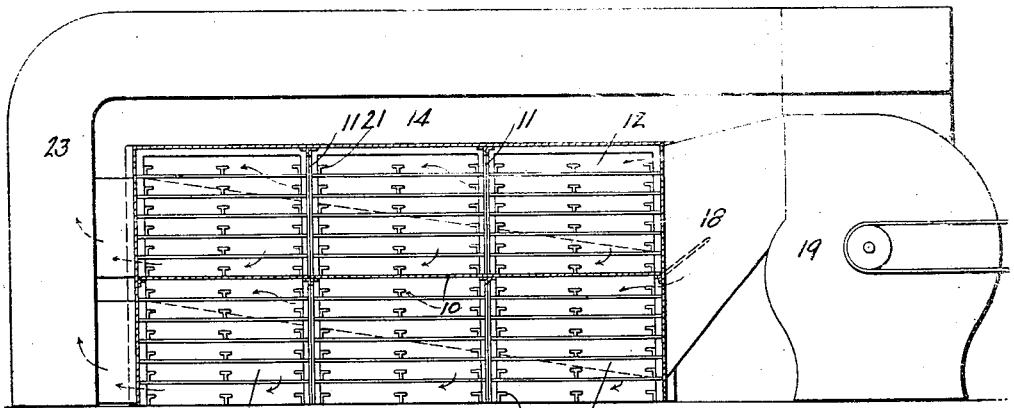
Fig. 2 is a section on line 2—2, Fig. 4.
Figure 3:
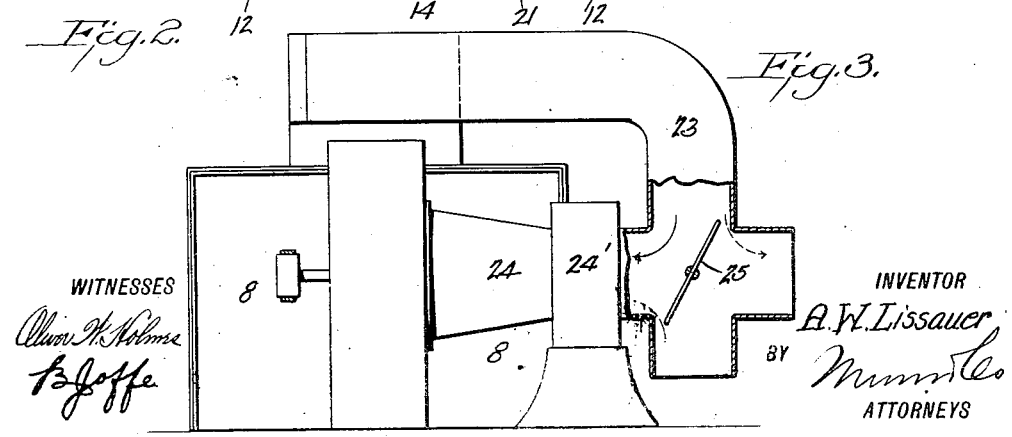
Fig. 3 is an end elevation with the damper control in section.

Referring to the drawings, 6 is a housing which has longitudinal partitions 7 dividing said housing longitudinally into two equal sections 8 spaced by a narrower central longitudinal section 9. To increase the efficiency of the device and reduce its cost, the housing 6 is built high enough so that the same can be subdivided into an upper and a lower half by a partition 10 extending through its entire length and width whereby the housing sections 8 and the sections 9 are subdivided into upper and lower halves which are identical in every respect, as will appear hereinafter. Each half of the housing section 8 is subdivided by vertical partitions 11 into chambers 12.

Each of the chambers has a top opening 13 and a bottom opening 14 establishing communication with the adjacent half of section 9. Each of the halves of section 9 is subdivided by a partition 15, disposed obliquely into passages, the upper passage 16 preferably forming an inlet and the lower passage 17, an outlet. In consequence, the upper openings 13 form the inlet openings into the chambers and the lower openings 14 form the outlet openings from the chambers. The reason for placing the partitions 15 obliquely is to provide sufficient volume to convey air to and from the successive chambers.

The upper passages 16 at their wider end are in communication with the exhaust 18 of a fan 19 whereby air is supplied to said chambers. The air entering into each of the chambers 12 is caused to travel along deflectors or baffles 20, preferably disposed horizontally in each of the chambers between the successive rails 21 on which the removable trays for material to be dried are placed. The trays are accessible through end doors 22 leading to each of the chambers independently.

The air circulated in each of the chambers, as indicated by the arrows, reaches the outlet opening 14 wherefrom it enters the outlet passage 17. The two outlet passages at their wider end enter a conduit 23 which is carried over the housing toward the inlet 24 of the fan. The flow from the conduit 23 to the inlet end of the fan and to the atmosphere, and from the atmosphere to the inlet end of the fan 24, is controlled by a damper 25. Between the damper and the fan a heater 24' is provided to preheat the air drawn by the fan through the cross. By manipulating the damper 25 the quantity of air coming from the drier and that of the atmosphere may be mixed in any desired quantity and thereby the efficiency of the drier varied according to the material to be dried. In other words, if desired, only a small quantity of fresh air may be added to the air taken from the drier. If desired, the air from the drier can be exhausted directly into the atmosphere and fresh air circulated therein; but experience has shown that the efficiency of the drier is considerably enhanced if a large part of the air coming from the drier, after circulating over the material to be dried, is mixed with fresh air, due to the reason that the moisture present in the air coming from the drier facilitates the drying of the material and prevents the formation of a crust on the surface of the material to be dried, which crust prevents the penetration of the drying air into the body of the material. It may be further remarked that it is a well known fact that moist air is a better drying agent than dry air. It must be understood that when reference is made to atmospheric or fresh air it does not necessarily mean the air directly from the atmosphere, for the air taken by the fan may be caused to pass through a humidifier.

It will be noted that in my arrangement the drying chambers are connected in parallel. The reason for it is that not only is less resistance offered to the fan, but a greater efficiency is obtained with the chambers in such an arrangement, as a sufficient amount of air is delivered to each of the chambers to travel over the substance to be dried without rendering the same inert or ineffective before it reaches the outlet of the chamber.

In cases where the chambers are connected in series the resistance to flow is considerable and the efficiency of the air is considerably decreased due to the length of the path of travel. It therefore becomes necessary to interpose heating devices from the air on its way through the chambers to restore to it the capacity of further drying as it travels along the material in the chambers connected in series.

While I have described the principle of operation, together with the device which I now consider to be the best embodiment thereof, I desire to have it understood that the device shown is merely illustrative and that such changes may be made as are within the scope of the appended claims.

I claim:

1. In combination, a drier having inlet and outlet air passages of varying cross-sectional area, chambers in said drier each having an inlet and an outlet opening to the corresponding passages, a fan adapted to deliver air to the inlet air passages at their maximum cross-sectional area, an outlet conduit from the maximum cross-sectional area to the outlet passages and leading to the fan, and means interposed between the inlet of the fan and the outlet conduit for controlling the mixture to be taken by the fan and delivered to the chambers.

2. In combination, a drier having inlet and outlet air passages of varying cross-sectional area, chambers in said drier each having an inlet and outlet opening to the corresponding passages, a fan adapted to supply air to the inlet air passages at their maximum cross-sectional area, an outlet conduit from the maximum cross-sectional area to the outlet passages and leading to the fan, means interposed between the inlet of the fan and the outlet conduit for controlling the mixture to be taken by the fan and delivered to the chambers, and a heater for preheating the air before the same enters the fan.

3. In a drier, a drying chamber having an inlet and an outlet opening on the same side, baffles extending from the side of the wall in which the inlet and outlet are formed, and baffles extending from the opposite side between the baffles first mentioned.

ADOLPH W. LISSAUER.